(12) United States Patent
Calcut et al.

(10) Patent No.: US 11,608,918 B2
(45) Date of Patent: Mar. 21, 2023

(54) HOSE CONNECTOR

(71) Applicant: Cooper Standard Automotive, Inc., Novi, MI (US)

(72) Inventors: Edward Francis Calcut, Ann Arbor, MI (US); Daniel P. Intalan, Rochester Hills, MI (US); Eric Omar Ruffin, Southfield, MI (US); Dennis G. Kreft, Davisburg, MI (US); Jeffrey William Clawson, Lake Orion, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 250 days.

(21) Appl. No.: 16/888,377

(22) Filed: May 29, 2020

(65) Prior Publication Data

US 2021/0372549 A1 Dec. 2, 2021

(51) Int. Cl.
*F16L 33/30* (2006.01)
*F16L 33/18* (2006.01)

(52) U.S. Cl.
CPC .............. *F16L 33/30* (2013.01); *F16L 33/18* (2013.01)

(58) Field of Classification Search
CPC ............ F16L 33/30; F16L 33/18; F16L 33/00
USPC ........................................................ 285/239
See application file for complete search history.

(56) References Cited

U.S. PATENT DOCUMENTS

| | | | |
|---|---|---|---|
| 5,135,268 A * | 8/1992 | McNaughton | F16L 37/0987 285/239 |
| 7,150,478 B2 | 12/2006 | Poirier et al. | |
| 7,735,877 B2 | 6/2010 | Ito et al. | |
| 8,523,242 B2 | 9/2013 | Hosotani et al. | |
| 2006/0012168 A1* | 1/2006 | Poirier | F16L 47/24 285/239 |
| 2015/0130184 A1* | 5/2015 | Filipczak | F16L 33/085 285/252 |

FOREIGN PATENT DOCUMENTS

| | | |
|---|---|---|
| EP | 1818592 A1 | 8/2007 |
| EP | 2492572 A1 | 8/2012 |
| JP | H09126374 A | 5/1997 |

OTHER PUBLICATIONS

"European Search Report for EP21165267", dated Sep. 24, 2021.

* cited by examiner

*Primary Examiner* — James M Hewitt, II
(74) *Attorney, Agent, or Firm* — Paschall & Associates, LLC; James C. Paschall; Anthony Miologos

(57) ABSTRACT

A hose connector is formed at the end of a rigid pipe body used to connect the pipe body to a flexible polymeric hose. The hose connector includes a frustoconical front end extending outward from a tip to a radially enlarged first ring portion that terminates at a circumferential first step. A radially reduced second ring portion extends from the first step backwards at a constant diameter to a circumferential rear edge. A circumferential second step extends from the second ring portion rear edge backwards in a decreasing circumferential diameter to a mid-section of the pipe body. A flexible hose is adapted to be inserted by pressure over the pipe body at the tip end until it passes beyond the second step to at least the mid-section of the pipe body.

13 Claims, 3 Drawing Sheets

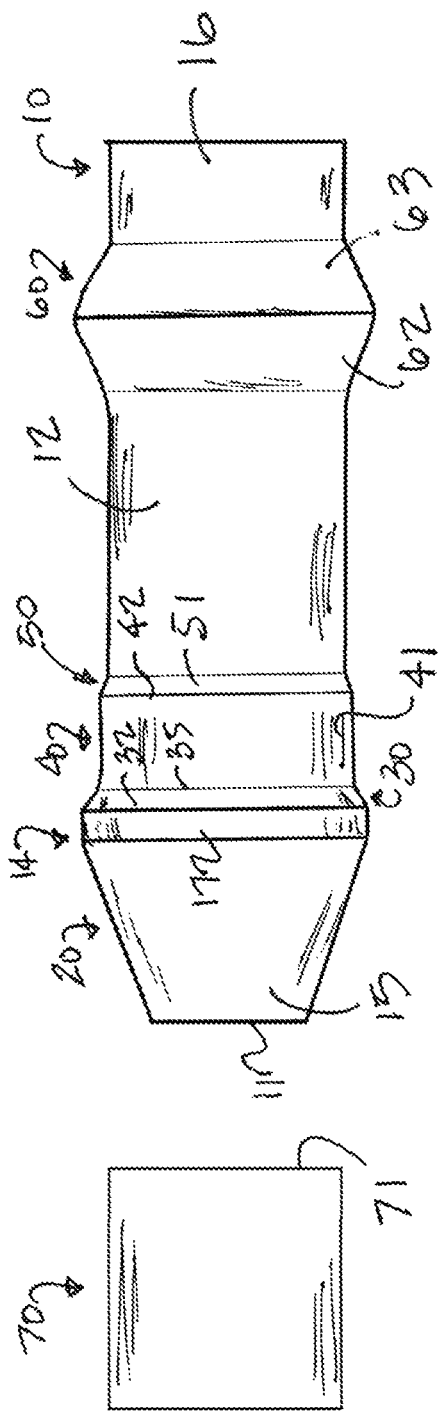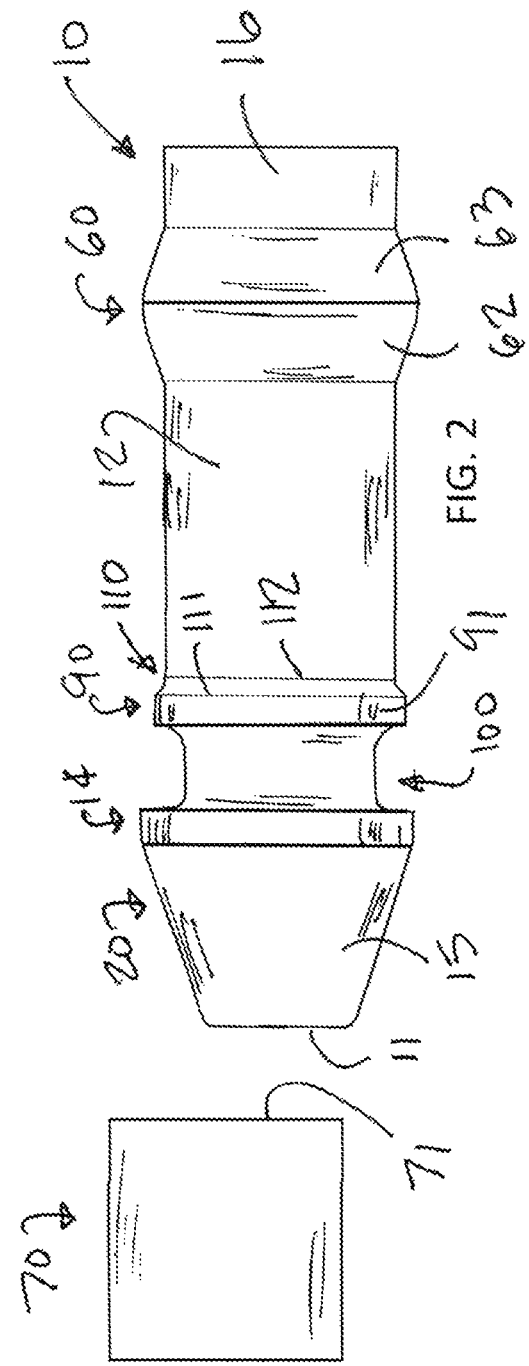

HOSE CONNECTOR

TECHNICAL FIELD

This disclosure is generally directed to a hose connector adapted to have a flexible polymeric hose fitted on the outer periphery of the hose connector. More specifically, it relates to a hose connector having radially enlarged stepped barrels or spools.

BACKGROUND

A hose connector formed at the end of a metal tube is typically used to connect the tubing to a flexible polymeric hose, such as, fuel tubing used between a vehicle's fuel tank and an engines carburetor or other fuel metering system. The fuel tubing can be part of a long rigid fluid line or a stem defined at the end of a connector body. The polymeric hose is fitted on the outer periphery of the hose connector to form a fluid connection between the fluid line or connector body with the polymeric hose. For this type of hose connector, a fluid tight seal is maintained only by the tightness of the polymeric hose. Therefore, when creep deformation of the hose occurs due to heat deterioration, the holding force decreases such that a fluid tight seal cannot be maintained. Other factors which contribute to a lack of fluid tight seal include variations in the size and tolerances of the hose connector and the polymeric hose, the inner surface finish of the hose, the outer surface finish of the metal tubing, the effects of chemicals, and the hardness and swell of the hose.

SUMMARY

This disclosure relates to a hose connector formed at the end of a rigid pipe body or tubing and used to connect the pipe body to a flexible polymeric hose.

In a first embodiment, a hose connector structure is provided comprising a rigid pipe body having a frustoconical front end extending outward from a tip end to a radially enlarged first ring portion. The first ring portion terminates at a circumferential first step with the first step decreasing in diameter from a rear edge of the first ring portion backwards to a first step rear edge. A radially reduced second ring portion extends from the first step rear edge backwards at a constant diameter to a circumferential rear edge. A circumferential second step extends from the second ring portion rear edge backwards in a decreasing circumferential diameter to a mid-section of the pipe body. A flexible hose is adapted to be inserted by pressure over the pipe body at the tip end until it passes beyond the second step to the midsection of the pipe body.

In a second embodiment, a hose connecter structure is provided comprising a rigid pipe body having a frustoconical front end extending outward from a tip end to a radially enlarged first ring portion. A radial second ring portion is spaced backwards from the first ring portion and forms an annular groove between the first ring portion and the second ring portion. The second ring portion terminates in a circumferential first step of a decreasing diameter from a rear edge of the second ring portion backwards to a mid-section of the pipe body. A flexible hose is adapted to be inserted by pressure over the pipe body at the tip end until it passes beyond the second ring portion and first step to the midsection of the pipe body.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 1 is a side elevational view of a hose connecter in accordance to a first embodiment of the present disclosure;

FIG. 2 is a side elevational view of a hose connector in accordance to a second embodiment of the present disclosure;

DETAILED DESCRIPTION

Figure 3:
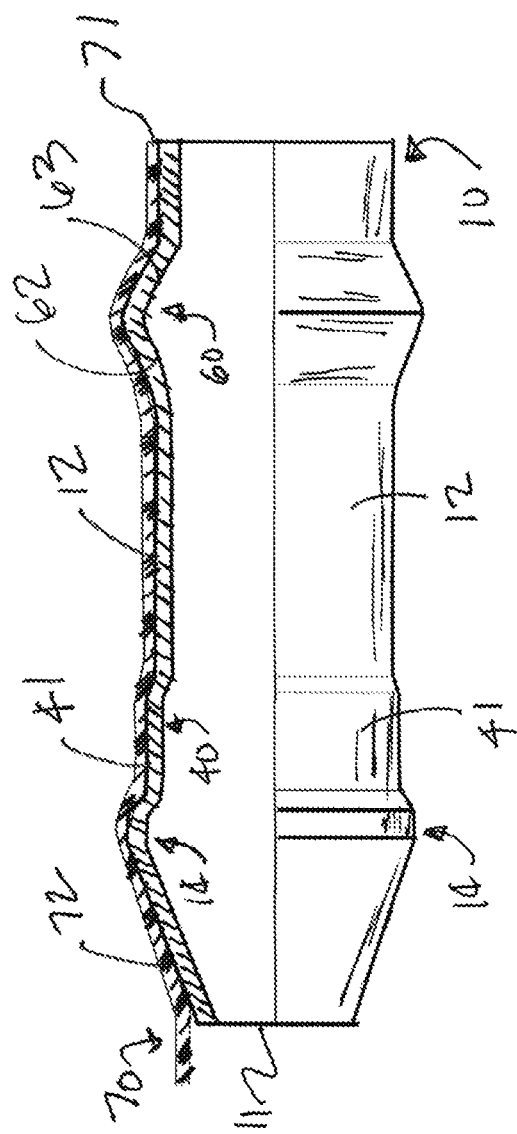
FIG. 3 is a side elevational view showing an upper-half sectional view of the hose connector of FIG. 1.

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

A hose connector of the disclosure is formed at the end of a rigid pipe body or tubing typically used to connect the pipe body to a flexible polymeric hose, such as the tubing used between a vehicle's fuel tank and engine carburetor or other fuel metering system. The pipe body can be part of a long rigid fluid line or a stem defined at the end of a connector body. The polymeric hose is fitted on the outer periphery of the hose connector to form a fluid connection between the fluid line or connector body with the polymeric hose.

FIG. 1 shows a first embodiment in which a rigid pipe body 10 extends horizontally from a rear end 16 to an opening 11 at a frustoconical front end 20. The frustoconical front end 20 extends outward from a tip 15 to a radially enlarged first ring portion 14. The first ring portion 14 includes an annular face 17 that extends backwards at a constant diameter from the frustoconical front end 20 towards the pipe body rear end 16, terminating at a circumferential first step 30. The first step 30 includes tapering walls 32 that extend backward toward the pipe body 10 rear end 16 in a decreasing diameter and terminating at a rear edge 35.

A second ring portion 40 has walls 41 that extend at a constant diameter backward from edge 35 to a rear edge 42. Second ring portion 40 has an external annular diameter that is less than the external annular diameter of first ring portion 14. Walls 41 of second ring portion 40 extend backward for a distance that is at least twice the distance that face 17 of first ring portion 14 extends backwards. That is, the surface width of walls 41 are at least twice the width of face 17. The circumferential second step 50 has walls 51 that taper backwards from the circumferential rear edge 42 of the cylindrical portion 40 in a decreasing diameter for a distance equal to the distance of walls 32 of first step 30. The second step 50 terminates at a mid-section 12 of rigid pipe body 10.

A radially enlarged barrel portion 60 is formed on the rear end 16 of the rigid pipe body 10, opposite and spaced away from the frustoconical front end 20. An outer surface of barrel portion 60 on the side nearest to the midsection 12 of pipe body 10 has a first tapered surface 62 of which the diameter becomes smaller as the distance to the midsection 12 decreases. An outer surface of the barrel portion 60 that is on the opposite side to the first tapered surface 62 is a second tapered surface 63 that is inclined in the opposite direction of the second tapered surface 62. The inclination angles of the first and second tapered surfaces 62, 63 are substantially the same. The barrel portion 60 extends parallel to the first ring portion 14 and has an external annular diameter that is equal to the external annular diameter of the first ring portion.

As can be best seen at FIG. 3, a flexible tube 70 made of polyamide resin, fluoroplastics, olefin resin, and so on, has an inside diameter that is slightly less than the outside diameter of pipe body 10. Therefore, when the flexible tube 70 is press-fitted onto pipe body 10, the flexible tube 70 makes a tight liquid-proof contact with pipe body 10. That is, with tube 70 installed, its inner surface 72 forms a tight hermetic closure with the first ring portion 14, walls 41 of second ring portion 40, the mid-section 12 of the pipe body 10 and tapered surfaces 62, 63 of barrel portion 60. The flexible tube 70 can be installed to at least the mid-section 12 of pipe body 10, however, it is fully installed when tip portion 71 reaches to the rear end 16 of pipe body 10.

FIG. 2 illustrates a second embodiment of the present disclosure. In the second embodiment, a rigid pipe body 10 horizontally extends from a rear end 16 to an opening 11 at a frustoconical front end 20. The frustoconical front end 20 extends outward from a tip 15 to first radial ring 14. A second radial ring 90 is formed on the base side, (i.e., a portion opposite to the tip 15) of the frustoconical front end 20. The second ring portion 90 has walls 91 that extend parallel to the first ring portion 14 forming a spool that defines an annular groove 100 therebetween. The second ring portion 90 has an external annular diameter that is slightly less than the annular diameter of the first ring portion 14. The second ring portion 90 ends at a circumferential first step 110. The first step 110 includes tapering walls 111 that extend backward toward the pipe body rear end 16 at a decreasing diameter terminating at a rear edge 112 at a mid-section 12 of rigid pipe body 10.

A radially enlarged barrel portion 60 is formed on the rear end 16 of the rigid pipe body 10 opposite and spaced away from the frustoconical from end 20. An outer surface of barrel portion 60 on the side nearest to the midsection 12 of pipe body 10 has a first tapered surface 62 of which the diameter becomes smaller as the distance to the midsection 12 decreases. An outer surface of the barrel portion 60 that is on the opposite side to the first tapered surface 62 is a second tapered surface 63 that is inclined in the opposite direction of the second tapered surface 62. The inclination angles of the first and second tapered surfaces 62, 63 are substantially the same. The barrel portion 60 extends parallel to first ring portion 14 and has an external annular diameter that is equal to the external annular diameter of the first ring portion.

Figure 4:
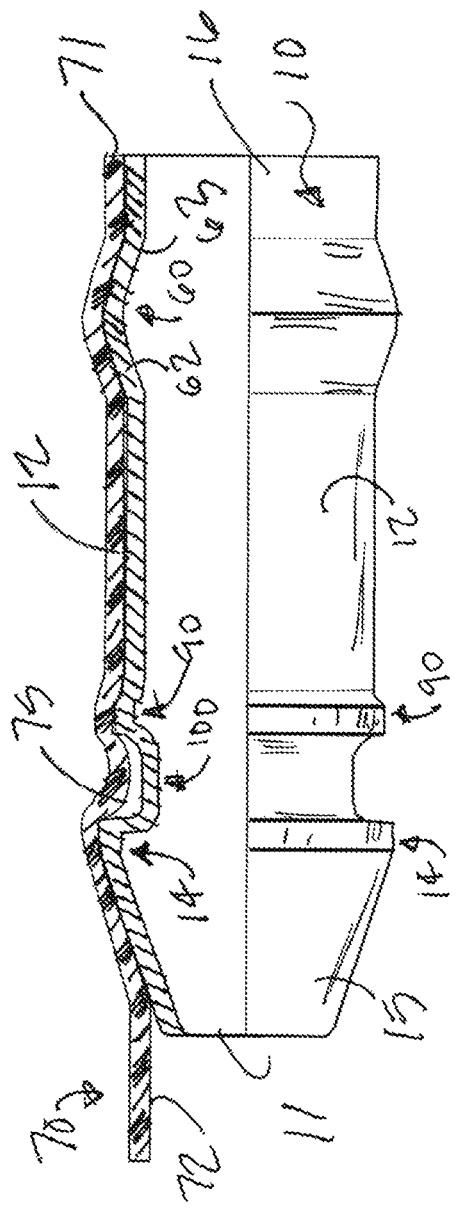
FIG. 4 is a side elevational view showing an upper-half sectional view of the hose connector of FIG. 2.

As can be best seen at FIG. 4, a flexible tube 70 made of polyamide resin, fluoroplastics, olefin resin, and so on, has an inside diameter that is slightly less than the outside diameter of pipe body 10. Therefore, when the flexible tube 70 is press-fitted onto pipe body 10, the flexible tube 70 makes a tight liquid-proof contact with the pipe body 10. That is, with tube 70 installed, its inner surface 72 forms a tight hermetic closure with the first ring portion 14, the second ring portion 90, the mid-section 12 of the pipe body 10 and tapered surfaces 62, 63 of barrel portion 60. The inner surface 72 of flexible tube 70 depresses inward into annular groove 100 to bridge between the first ring portion 14 and the second ring portion 90 forming a concaved bridge surface 75 therebetween. The concave bridge 75 serves to not only provide a tight seal between the first and second ring portions 14 and 90 but also a more robust grip on the hose connector structure due to the difficulty of the concave bridge surface 72 overcoming the height of the rings. The flexible tube 70 can be installed to at least the mid-section 12 of pipe body 10, however, it is fully installed when tip portion 71 reaches to the rear end 16 of pipe body 10.

Figure 5:
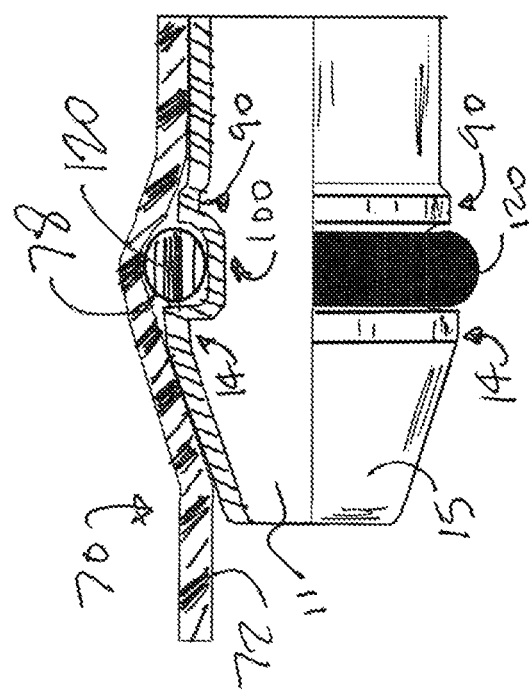
FIG. 5 is a side elevational view showing a partial upper-half sectional view of FIG. 4 and illustrating the installation of an O-ring to the hose connector of the second embodiment of the present disclosure.

As is shown in FIG. 5, the annular groove 100 can also have an O-ring 120 installed therein. The O-ring 120 may be made of fluorocarbon polymers, or other fluoropolymers. With the O-ring 120 installed in groove 100, flexible tube 70 inner surface 72 forms itself over O-ring 120 to make a convex sealing portion 78. Sealing portion 78 thus makes a tight hermetic seal with O-ring 120 when the tube 70 is installed over pipe body 10.

The frustoconical front end 20 and first ring portion 14, first step 30 and second ring portion 40 and its second step 50 may be formed on pipe body 10 using any technique that forms stepped-barrel structures on rigid pipe bodies. Additionally, the barrel portion 60 may also be formed on pipe body 10 using a tapered-barrel technique. The second ring portion 90 and first step 112, of the second embodiment of FIG. 2, may be formed using any spool forming technique. The structures formed on pipe body 10 may be formed as a single unitary structure from a suitable metal material or a rigid polymer material.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A hose connector structure comprising:
   a rigid pipe body having a frustoconical front end extending outward from a tip end to a radially enlarged first ring portion, the first ring portion having an annular face extending at a consistent diameter away from the frustoconical front end;
   a second ring portion having a radially reduced annular face that extends parallel to the first ring portion annular face spaced away from the first ring portion;
   an annular groove formed between the first ring portion annular face and the second ring portion annular face, the second ring portion annular face terminating in a circumferential first step of a decreasing diameter from a rear edge of the second ring portion annular face to a mid-section of the pipe body;
   a barrel portion spaced from the second ring portion at a rear portion of the pipe body including first and second tapered surfaces having diameters that become smaller as the distance to the rigid pipe body decreases; and
   a flexible hose adapted to be inserted by pressure over the pipe body at the tip end until it passes beyond the second ring portion and first step and the barrel portion.

2. The hose connector structure according to claim 1, wherein the barrel portion has an outer diameter approximately equal to the first ring portion.

3. The hose connector structure according to claim 2, wherein the second ring portion has a circumferential diameter that is less than the first ring portion.

4. The hose connector structure according to claim 1, wherein the first and second ring portions, the first step and the barrel portion are formed on the pipe body as a unitary structure using one or more body-forming methods.

5. The hose connector structure according to claim 1, wherein the pipe body is made of a metallic material.

6. The hose connector structure according to claim 1, wherein the pipe body is made of a polymer material.

7. The hose connector structure according to claim 6, wherein the tube is composed of a polyamide resin, fluoroplastic or olefin resin material.

8. The hose connector structure according to claim 1, wherein a ring of elastomeric material is fitted into the annular groove.

9. A hose connector structure comprising:
 a rigid pipe body having a frustoconical front end extending outward from a tip end to a radially enlarged first ring portion, the first ring portion having an annular face extending at a consistent diameter away from the frustoconical front end and terminating at a circumferential first step, the first step decreasing in diameter obliquely from a rear edge of the first ring portion annular face to a first step rear edge;
 a radially reduced second ring portion spaced away from the first ring portion;
 a circumferential second step extending obliquely from a rear edge of the second ring portion in a decreasing circumferential diameter to a mid-section of the pipe body;
 a barrel portion spaced away from the second ring portion at a rear portion of the pipe body wherein the barrel portion has an outer diameter approximately equal to the first ring portion and first and second tapered surfaces whose diameters become smaller as the distance to the rigid pipe body decreases; and
 a flexible hose adapted to be inserted by pressure over the pipe body at the tip end until it passes beyond the barrel portion.

10. The hose connector structure according to claim 9, wherein the frustoconical front end, the first ring portion and the first step, the second ring portion and the second step and the barrel portion are formed on the pipe body as a unitary structure using one or more body-forming methods.

11. The hose connector structure according to claim 10, wherein the pipe body is made of a metallic material.

12. The hose connector structure according to claim 10, wherein the pipe body is made of a polymer material.

13. The hose connector structure according to claim 9, wherein the tube is composed of a polyamide resin, fluoroplastic or olefin resin material.

* * * * *